March 5, 1968 R. E. BACHMAN ET AL 3,372,336
RECEIVER INCLUDING INPUT OVERLOAD PROTECTION CIRCUIT
Filed Dec. 16, 1964
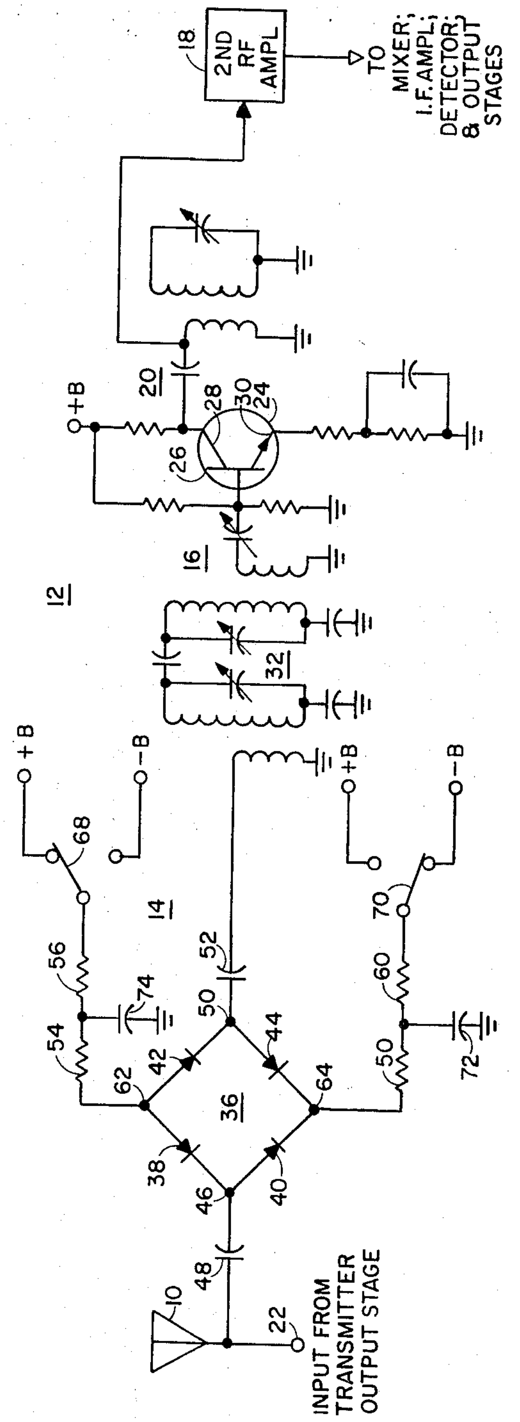
INVENTOR.
GABRIEL J. LUHOWY
RAYMOND E. BACHMAN
BY Martin LuKacher
ATTORNEY United States Patent Office 3,372,336

Patented Mar. 5, 1968

3,372,336

RECEIVER INCLUDING INPUT OVERLOAD PROTECTION CIRCUIT

Raymond E. Bachman and Gabriel J. Luhowy, Rochester, N.Y., assignors to General Dynamics Corporation, a corporation of Delaware Filed Dec. 16, 1964, Ser. No. 418,671
7 Claims. (Cl. 325—376)

This invention relates to communications apparatus, and particularly to radio apparatus having an input protective circuit.

The invention is especially useful in providing an antenna overload circuit for receivers having transistor radio frequency amplifier stages or other current sensitive components and is operative to protect the transistors and such components from damage due to large signals which are induced or otherwise coupled into the antenna. The invention is also useful in providing a transmit receive switching circuit for use in a transceiver.

It is an object of the invention to provide improved radio apparatus, by radio being meant any apparatus for transmitting and receiving signals including without limitation, audio signals, code signals and television signals.

It is another object of the present invention to provide an improved radio receiver input protective circuit which does not appreciably alternate input signals and thereby does not add an insertion loss in the input stages of the receiver so that the receiver noise figure is not degraded.

It is still another object of the invention to provide an improved radio receiver input protective circuit which does not introduce non-linear distortion of received signals or affect fidelity of reception.

It is a further object of the invention to provide an improved radio receiver input protective circuit which operates substantially instantaneously, i.e. for only the first few cycles of an overloading input radio frequency signal, to protect the receiver input against overloading signals.

It is a still further object of the present invention to provide an improved radio receiver input protective circuit which provides protection for sensitive circuit components such as transistors, even under conditions where receiver power is not applied.

It is a still further object of the present invention to provide an improved radio receiver protective circuit which can be produced at low cost and is reliable in operation.

Briefly described, a radio receiver embodying the invention includes a radio frequency amplifier which is connected through a diode bridge circuit to an antenna. Resistors are connected to the bridge for biasing the diodes in the forward direction unless the signals induced or otherwise coupled to the antenna having amplitudes exceeding the biasing level. Capacitors connected to the resistors are provided for storing the signals which exceed the biasing levels for a sufficient period of time, thereby avoiding transient effects. The bridge thereby inserts a high impedance in response to an overload condition. Otherwise no significant loss of signal amplitude is due to the insertion of the circuit. The response of the circuit is virtually instantaneous since the diodes react within the first few cycles of a radio frequency overload signal.

The invention itself, both as to its organization and method of operation, as well as additional objects and advantages thereof will become more readily apparent from a reading of the following description in connection with the accompanying drawing in which:

The sole figure of the drawing is a schematic diagram partially in block form, of a radio transceiver incorporating the invention.

A source of radio signals, such as an antenna 10 provides signals for a radio receiver 12. The receiver includes an input circuit 14 which in turn includes an R.F. amplifier stage 16. A second R.F. amplifier stage 18 is coupled to the load circuit 20 of the first R.F. amplifier stage 16. The latter stage 18 is coupled to a mixer which provides signals for an intermediate frequency amplifier, detector and output stages of the receiver (not shown). The mixer may be supplied signals from a frequency synthesizer or other local oscillator system. In the event that the receiver 12 is part of a transceiver, input signals from the output stage of the transmitter portion of the transceiver may be applied to the antenna 10 at an input terminal 22.

The R.F. amplifier 16 includes a transistor 24 having an input electrode provided by its base 26 and output electrodes provided by its collector 28 and emitter 30. The base is connected to a double tuned resonant circuit 32 including variable capacitors for tuning the circuit 32 to the frequency of a desired signal which is picked up by the antenna 10. The transformers of this circuit are sensitive to overload currents and may burn out if such currents are applied thereto. Overload current may arise from various sources. For example, when the antenna is a whip antenna, it may be inadvertently brought in contact with a bare power line. The power surge could burn out the resonant circuit transformers and possibly also the transistor.

The load circuit similarly is a resonant circuit which can be tuned by means of a variable capacitor therein.

The input circuit 14 also includes a circuit for protecting the radio receiver and particularly the transistors of the R.F. amplifier stages 16 and 18 thereof from damage and even from destruction due to surges in the signal picked up by the antenna as well as due to any signal induced or coupled into the input circuit 14, such as power line currents mentioned above. This protective circuit includes a bridge circuit 36, the four arms of which contain diodes 38, 40, 42 and 44. This bridge connects the base 26 of the transistor 24 to the antenna 10 by way of the resonant circuit 32. The antenna 10 is connected to one apex 46 of the bridge 36 through a capacitor 48. The resontant circuit 32 is connected to the apex 50 of the bridge opposite the first mentioned apex 46 through another capacitor 52.

The bridge diodes are biased in the forward direction by a biasing circuit including a first pair of resistors 54 and 56 and a second pair of resistors 58 and 60 which are connected and respectively to opposite apexes 62 and 64 of the bridge 36. The resistors 54 and 56, which are connected to the bridge apex 62 to which the anode of diodes 38 and 42 in adjacent arms of the bridge are also connected, are connected to a source of positive voltage indicated as +B through a switch 68. The other resistors 58 and 60, which are connected to the bridge apex 64 to which the cathodes of diodes 40 and 42 are both connected, are connected to a source of negative voltage indicated as —B through a switch 70. The voltage sources +B and —B are returned to a point of reference potential, such as ground.

The switches 68 and 70 may selectively connect the resistors to either of the oppositely polarized sources for biasing the bridge diodes 38, 40, 42 and 44 in the reverse direction. The biasing voltage sources and resistor values are chosen so that the diodes are biased to a preset voltage level below that which the resonant circuit and transistor 28 are rated to handle.

Capacitors 72 and 74 are connected to the resistors 54, 56, 58, and 60, respectively. The condensors 72 and 74 are effectively connected to the antenna through oppositely polarized diodes 40 and 42 and define charging circuits operative when the antenna signal level exceeds the preset biasing level applied by the biasing means to the bridge diodes. When the power is off and biasing voltages are not applied to the bridge, the bridge presents a high impedance between the antenna and the R.F. amplifier 16. Accordingly, overloading currents coupled, induced, or otherwise applied to the antenna will not adversely affect the receiver.

During the normal operation when incoming signals do not have amplitudes exceeding the preset biasing levels, the signals pass through the bridge diodes with negligible attenuation since the diodes are forward biased. The diodes are also operated over a portion of their characteristics which do not have a third order transfer function and do not produce any non-linear distortion such as cross modulation distortion of the radio signals.

On the other hand, when the peak of the signal has an amplitude which exceeds the preset level, the diode 40 passes that of the positive peak while the diode 38 is back biased and does not do so. However, the capacitor 72 in series with the diode 40 becomes charged to a polarity which back biases the diode 44. On the negative half-cycle of the input signal surge, the capacitor 74 is charged and the diodes 38 and 42 are similarly back biased. Accordingly, the bridge is conditioned automatically to present a high impedance for the voltage surges. The bridge circuit operates as a clipper to clip the peaks of the signal which exceed the preset biasing level. Accordingly, information contained in many types of radio signals such as FM signals may nevertheless be derived by the radio receiver.

The resistors and capacitors define circuits having discharge time constants longer than their charging time constant. Accordingly, the bridge retains its high impedance state until the surge clearly passes thereby avoiding adverse transient effects.

Solely by way of example and without limitation, the following are presented as suitable values for components of the input circuit 14 when that circuit is part of a communications receiver designed to operate in the high frequency band (2 mc. to 30 mc.):

Diodes 38, 40, 42 and 50—type IN 3064
Capacitors 48 and 52—0.001 μf.
Capacitors 72 and 74—0.2 μf.
Resistors 54 and 58—160 ohms
Resistors 56 and 60—2.7 ohms
+B Source—+12 volts; and
−B Source—ground potential.

From the foregoing description it will be apparent that there has been provided improved radio apparatus which is protected against overload conditions. Variations and modifications in the desired apparatus within the scope of the invention, will undoubtedly, become apparent to those skilled in the art. For example, the charging circuit capacitors function may be provided by the capacitors 48 and 52 by increasing their values giving consideration to the internal impedance of the antenna 10 and resonant circuit 32. Accordingly, the foregoing description should be taken as illustrative and not in any limiting sense.

What is claimed is:

1. A radio receiver input circuit for coupling the receiver to a source of radio signals, said input circuit comprising
   (a) an amplifier stage including a current sensitive component,
   (b) circuit means including a bridge circuit for coupling said component to said radio signal source,
   (c) said bridge circuit including an individual diode in each arm thereof,
   (d) means for biasing said diodes in their forward direction including a plurality of resistors respectively connected to said source through said bridge by way of different ones of said arms of said bridge, said different ones of said arms including different ones of said diodes which are polarized in opposite senses, and
   (e) capacitor means connected to said different ones of said diodes for charging whenever the voltage of said source exceeds said biasing voltage.

2. The invention as set forth in claim 1 wherein said source and said component are connected respectively to opposite apexes of said bridge and wherein said resistors are connected to other opposite apexes of said bridge.

3. The invention as set forth in claim 2 wherein said capacitor means comprises a pair of capacitors, one of which capacitors is connected between a point of reference potential and the one of said resistors which is connected to one of said other opposite apexes of said bridge and the other of which capacitors is connected to the other of said resistors which is connected to the other of said other opposite apexes of said bridge.

4. The invention as set forth in claim 1 wherein said capacitor means and said resistors define a charging circuit having a time constant equal to the period of few cycles of the radio signal from said source.

5. The invention as set forth in claim 1 wherein said biasing means includes switching means for selectively biasing said bridge diodes in their reverse direction.

6. The invention as set forth in claim 1 wherein said current sensitive component is a resonant circuit including inductive devices.

7. The invention as set forth in claim 1 wherein said current sensitive component is a transistor having an input electrode and output electrodes, said output electrodes being connected to a load circuit and said input electrode being coupled to said source through said circuit means.

No references cited.

KATHLEEN H. CLAFFY, *Primary Examiner.*

R. S. BELL, *Assistant Examiner.*